Sept. 9, 1969 R. G. LANDRY ET AL 3,465,690
LINEAR ADVANCING MECHANISM
Filed Oct. 31, 1967 5 Sheets-Sheet 3
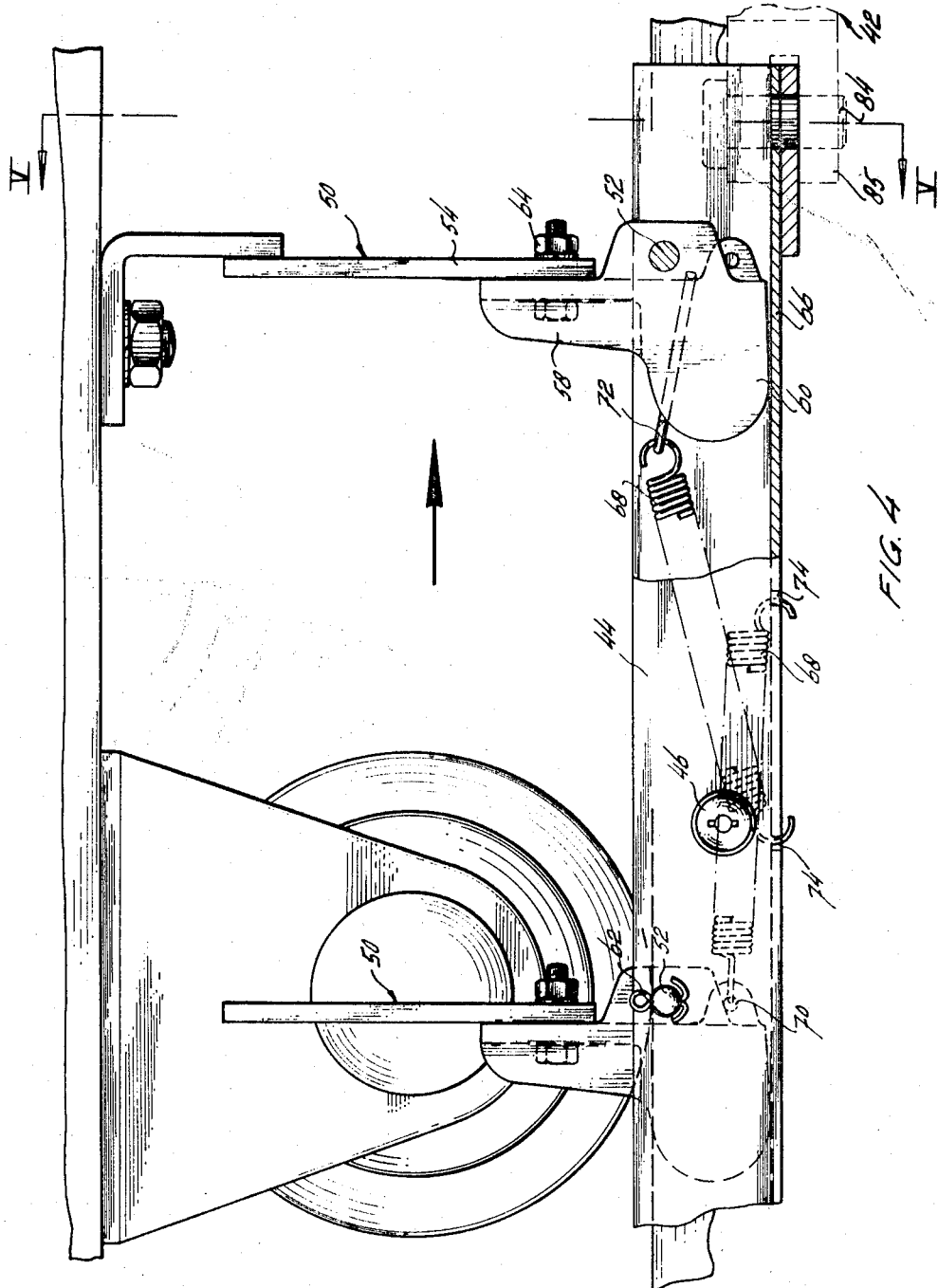
INVENTORS
ROBERT G. LANDRY
SHERMAN R. JENNEY
BY Semmes & Semmes
ATTORNEYS

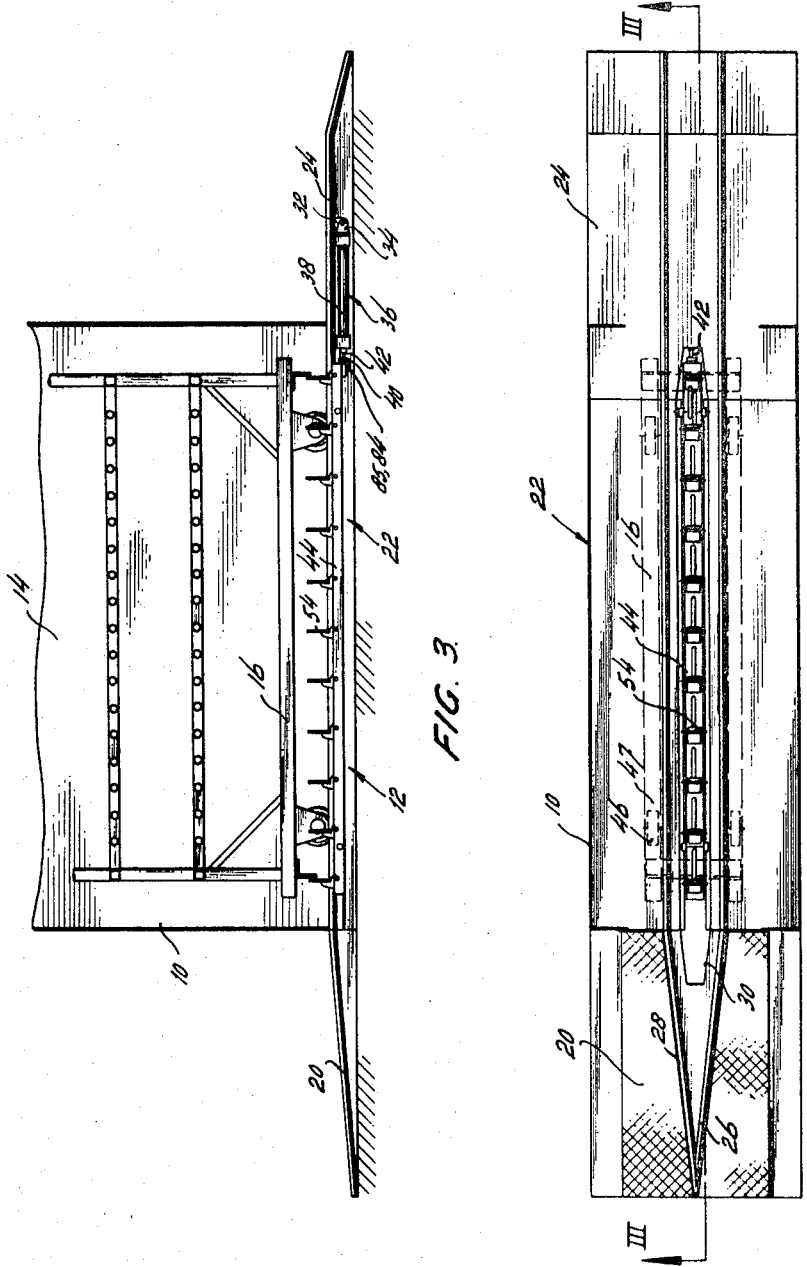

United States Patent Office 3,465,690
Patented Sept. 9, 1969

3,465,690
LINEAR ADVANCING MECHANISM
Robert G. Landry, Lewiston, and Sherman R. Jenney, Auburn, Maine, assignors to Diamond Machinery Company, Lewiston, Maine, a corporation of Maine
Filed Oct. 31, 1967, Ser. No. 679,359
Int. Cl. B61b *13/00;* F27b *9/24*
U.S. Cl. 104—162
4 Claims

ABSTRACT OF THE DISCLOSURE

A reciprocating, linear advancing mechanism of the type used for advancing a rack or pallet through a drying or treating area, the advancing mechanism consisting of a reciprocating wheeled guide, having a plurality of depressible, vertically extending plates.

BACKGROUND OF THE INVENTION

Field of the invention

Earlier inventors have addressed themselves to the problem of advancing a rack of materials to be dried or treated into or out of a treating zone, such as a kiln for drying of lumber or ceramic materials, a textile yarn steamer, or a heat tunnel for curing of glass or drying of leather. These inventors have devised endless chains mounted within the floor to pull wheeled carts into and out of the kiln. Also, an endless track has been suspended from the kiln roof to support material as it advances through the kiln. For the most part, these devices have been relatively complex, expensive and incapable of moving from place to place.

According to applicant's invention, a low profile, reciprocating portable track is placed within the floor of the heating tunnel so as to advance linearly a rack through the heating tunnel. Because of its portability, the rack may be moved from place to place within a production line. The rack includes a movable, reciprocating guide and an air cylinder reciprocating power means. The guide has a plurality of vertically extending plates which are locked in an advancing position and depressible in the retreating position during the return stroke. As a result, a rack may be pushed onto the guide depressing the plate as it is advanced onto the guide, then as the guide is reciprocated the plates are locked against the rack as it is advanced in reciprocated movement through the tunnel or treating zone. Upon each return or reciprocation stroke of the guide, the plates are depressed beneath the rack, which remains stationary on return linearly to its advancing position.

Description of the prior art

Rhoads (1,595,928) employs a wheeled cart for movement of ceramic materials into and out of a kiln. Rhoads (1,689,082) employs an endless chain mounted within the floor so as to engage and pull a wheeled cart into and out of a ceramic oven. Mueller (1,757,647) embodies a track for a wheeled lumber carriage advanceable into and out of a lumber drying kiln. Waddelle (3,225,455) employs a wheeled carriage for advancing material into and out of a textile yarn steamer. Kahn (2,724,191) supports leather hides upon plates movable upon an endless track extending into and out of a leather drying kiln.

None of these prior inventors contemplated linear advancing by means of a reciprocating guide having depressible plate members engaging the rack or cart to be transported.

SUMMARY OF THE INVENTION

According to the present invention a base, including an inclined entry ramp and an inclined exit ramp, defines a linear advancing area. A reciprocating wheeled advancing guide is supported in this area with a plurality of vertically extending lugs or plates extending above the base so as to engage and push a rack. An air cylinder, electric or like driving means, may be used to reciprocate the advancing guide. The vertically extending plates are depressible when engaged on one side during the return or reciprocation stroke and when engaged on the other side are locked during the advancing stroke. As a result, a rack or pallet may be pushed onto the guide, a limit switch is then tripped to activate the air cylinder which reciprocates the guide beneath the rack, thus advancing the rack through a heat tunnel or the like along to the inclined exit ramp where it is gravity-discharged. Since the base is low-profiled and portable, the entire unit can be easily moved from one point to another and quickly adapted to any production run.

BRIEF DESCRIPTION OF THE DRAWINGS

FIG. 2 is a top plan of the advancing mechanism within the air drying kiln;

FIG. 3 is a cross-section of the air drying kiln with advancing mechanism according to FIG. 2, showing in phantom the rack being engaged by the vertically extending plates during the advancing stroke;

FIG. 4 is an enlarged, fragmentary elevation of the advancing guide showing two of the vertically extending plates together with the spring means for returning them to the vertical position after being depressed;

DESCRIPTION OF THE PREFERRED EMBODIMENTS

Figure 1:
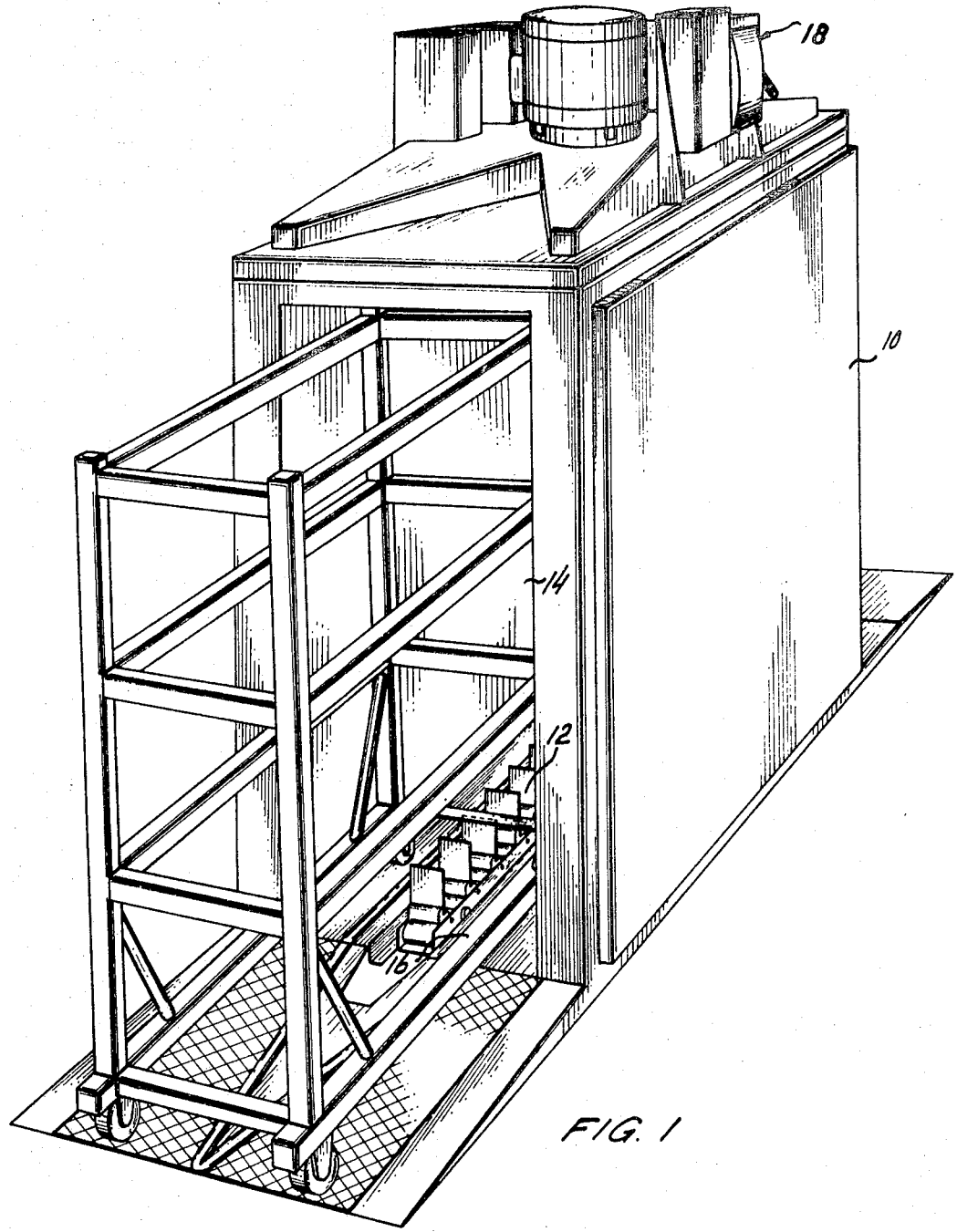
FIG. 1 is a perspective view of linear advancing mechanism 12 floor-mounted within an air drying kiln and showing a rack about to be pushed onto the entry ramp.

In FIG. 1 a conventional tunnel drier 10 is illustrated as having linear advancing mechanism 12 extending through its open floor section within drying zone 14. A wheeled rack 16 of the type having a plurality of shelves is shown adjacent the entry ramp. A squirrel cage forced air blower-heater combination 18 may be mounted on the roof of the tunnel so as to force heated air through a plurality of holes in the tunnel side. Conventionally, such air heating systems include recirculating means.

In FIG. 2 the rack runner is illustrated as comprising entry ramp 20 which may be diamond plated or burred, mid-portion 22 and exit ramp 24. Angle iron guides 26 and 28 may be employed to guide the rack wheels in its mode of linear advancement. These guides 26 and 28 extend on both sides of an open center portion 30 through which the vertically extending rack engaging plates 54 extend.

The air cylinder driving mechanism 36 is illustrated as affixed to transverse plate 32 by means of bracket 34 and includes air chamber cylinder 38 and at one end horizontally extending piston 42 to which clevis 40 may be attached. Clevis 40, in turn, is secured to advancing guide channel bracket 85 by pin 84.

Figure 6:
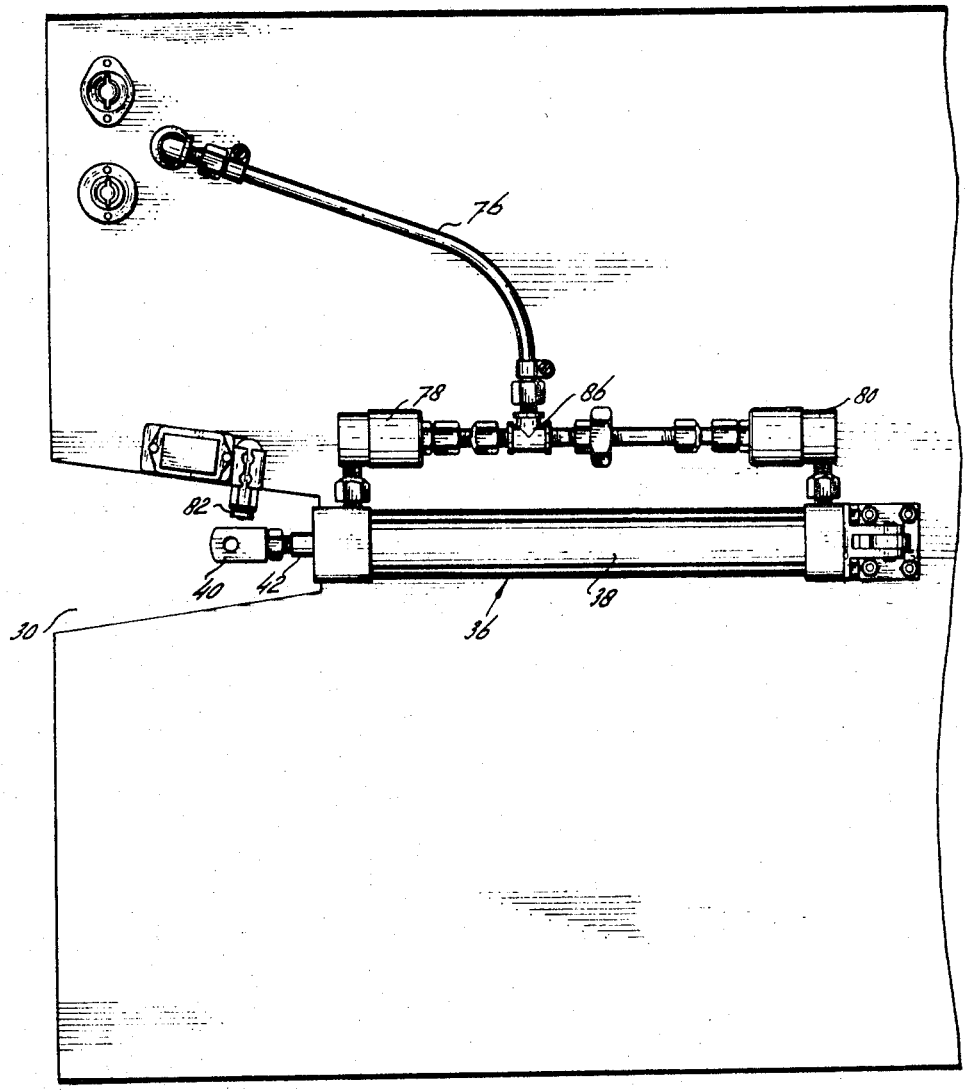
FIG. 6 is a schematic view of the air cylinder driving mechanism.

As illustrated in FIG. 6 the air cylinder may be of the conventional type fed by air tube 76 to a T connection 86 having valves 78 and 80 at either end thereof. A vertically extending limit switch 82 may be employed to deactivate the reciprocatory action as a rack is rolled off the open center 30. A similar type switch may be positioned adjacent the open center 30 in ramp 20, so as to activate reciprocatory action, as a rack is fed into the kiln.

Figure 5:
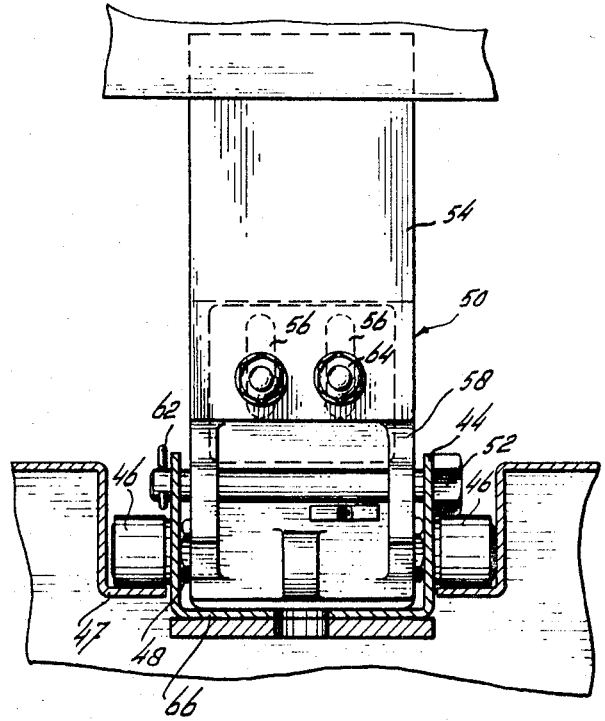
FIG. 5 is a sectional view of the advancing guide taken along section lines 5—5 of FIG. 4.
Figure 7:
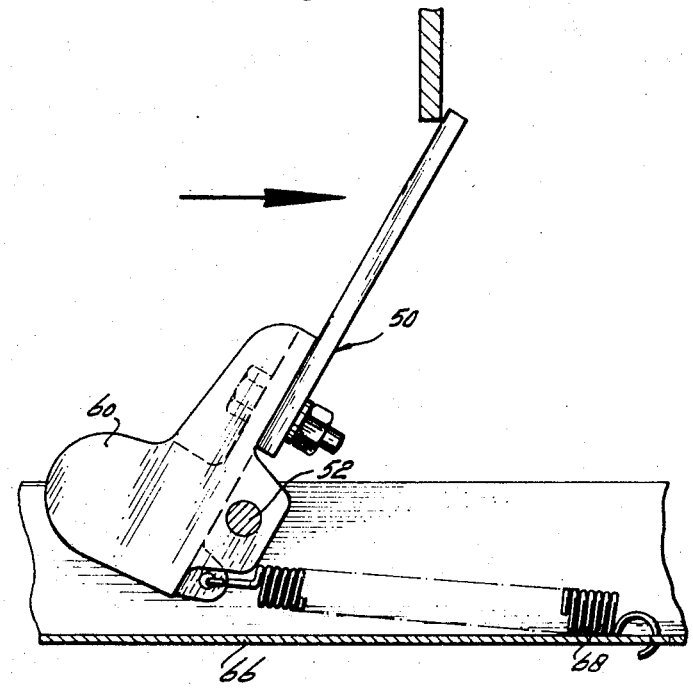
FIG. 7 is a fragmentary view, showing a vertically extending plate in its depressed position during the return or reciprocation stroke, as the advancing guide is moved beneath the stationary rack.

Turning to FIGS. 4 and 5, channel 44 is illustrated as having cam followers 46 extending from either side thereof, the cam followers being mounted upon transverse shaft 48. Cam followers 46 engage track 47 so as to wheelably support channel 44, as it is reciprocated by means of piston 42. The vertically extending advancing lugs are generally designated as 50 and include plates 54 secured to base castings 58 by means of hex-head bolts 64 which extend through adjusting holes 56. Pivotable base 58 includes a laterally extending shoulder 60 which abuts the channel bottom 66, so as to lock the vertically extending plate in its attitude of advancing in the direction shown by the arrow in FIG. 4. Base 58 may be mounted upon transverse shaft 52 by means of cotter pin 62 and may be secured to the channel bottom 66 by means of free length extension springs 68, extending through holes 70 or 72 at either end of the base and thence into hole 74 cut into channel 44 bottom. Free length springs 68, as illustrated in FIG. 7, cause the return of the vertically extending plates, 54 after they are depressed either by pushing in the direction of the arrow shown in FIG. 7, so as to advance material onto the guide, or by movement of the guide beneath the stationary rack during the return stroke.

As will be apparent, the dimensions of the linear advancing mechanism can be readily varied to suit any production run. Also, a timing mechanism can be secured to the air cylinder so as to regulate the frequency of reciprocation and thus the amount of time required for the pallet advance through the tunnel. Also, an exit limit switch means may be employed to cut off the reciprocation of the guide, as the rack is advanced through the tunnel area.

Manifestly, various types of reciprocatory guides may be employed without departing from the spirit and scope of invention, as defined in the claims.

We claim:

1. A linear advancing mechanism of the type used for advancing racks through a linear plane comprising:
    (A) a low-profile base defining a linear advancing area having a longitudinal aperture;
    (B) an advancing guide reciprocably supported upon wheels engaging tracks in said base on either side of said aperture, and said guide including:
        (i) a plurality of rack-engaging, vertically extending plates pivoted transversely of said guide so as to extend upwardly through said longitudinal aperture, said vertically extending plates including a pivotable base and spring means interconnecting said plate base and said advancing guide, so as to return said plates to vertically extended position sequentially of their being depressed to a position substantially parallel with the top of said rack advancing mechanism, when engaged from one side and said plates being locked vertically in said base when engaged from the other side; and
    (C) air cylinder power means including a horizontally extending piston connected to said advancing guide by clevis means so as to reciprocate said guide within said base.

2. A linear advancing mechanism as in claim 1, including limit switch means mounted in said base and extending vertically within said linear advancing area, so as to actuate said air cylinder upon advancement of a rack into said area.

3. Linear advancing mechanism as in claim 1, said base being inclined at both ends to define an entry ramp and an exit ramp.

4. A linear advancing mechanism as in claim 1, said air cylinder including a timer mechanism, limiting the cycle of reciprocation of said piston as a function of the time a rack is to be advanced through said linear plane.

References Cited

UNITED STATES PATENTS

| | | | |
|---|---|---|---|
| 441,196 | 11/1890 | Ryan | 263—28 |
| 1,161,587 | 11/1915 | Ayres | 34—87 |
| 2,010,462 | 7/1935 | Nielsen | 254—89 |
| 2,421,690 | 6/1947 | Ensor et al. | 104—162 X |
| 2,461,770 | 2/1949 | Puccinelli | 104—162 X |
| 2,847,945 | 8/1958 | Merritt | 104—162 |
| 2,928,158 | 3/1960 | Miller | 263—28 X |
| 3,225,455 | 12/1965 | Waddelle | 34—77 |

KENNETH W. SPRAGUE, Primary Examiner

U.S. Cl. X.R.

34—201